United States Patent [19]

Erisman et al.

[11] 4,091,184

[45] May 23, 1978

[54] HIGH POWER, RECHARGEABLE, PILE TYPE SILVER ZINC BATTERY

[75] Inventors: Lester R. Erisman, Joplin, Mo.; Richard A. Marsh, Tipp City, Ohio

[73] Assignee: The United States of America as represented by the Secretary of the Air Force, Washington, D.C.

[21] Appl. No.: 826,225

[22] Filed: Aug. 19, 1977

[51] Int. Cl.² .......................................... H01M 10/32
[52] U.S. Cl. .................................. 429/139; 429/152; 429/210; 429/219; 429/231
[58] Field of Search .............. 429/210, 219, 231, 152, 429/153, 154, 149, 139, 185; 204/254, 268

[56] References Cited

U.S. PATENT DOCUMENTS

| 2,968,686 | 1/1961 | Duddy | 429/153 X |
|---|---|---|---|
| 3,170,820 | 2/1965 | Drengler et al. | 429/210 X |
| 3,488,220 | 1/1970 | Lyall et al. | 429/210 X |
| 3,770,505 | 11/1973 | Bergum et al. | 429/210 X |

FOREIGN PATENT DOCUMENTS 875,977  8/1961  United Kingdom ................. 429/210

Primary Examiner—Anthony Skapars
Attorney, Agent, or Firm—Joseph E. Rusz; Arsen Tashjian

[57] ABSTRACT

A high rate rechargeable silver-zinc pile type battery including a plurality of bipolar electrodes which are assembled into a full scale multi-cell pile. Each of bipolar electrodes includes a positive side having a porous silver matrix attached to silver foil and a negative side having a porous zinc structure vapor deposited on silver foil. A separator including three different components in layers is disposed between the positive and negative sides of the bipolar electrode. An epoxy adhesive is used to position and retain a seal in its proper location to electrically isolate the individual electrodes and form a cavity for retention of the electrolyte. Intercell connectors of etched silver foil serve as the cell case and active material substrate as well as the series connection between individual cells for electrical continuity.

6 Claims, 3 Drawing Figures

U. S. Patent          May 23, 1978          4,091,184
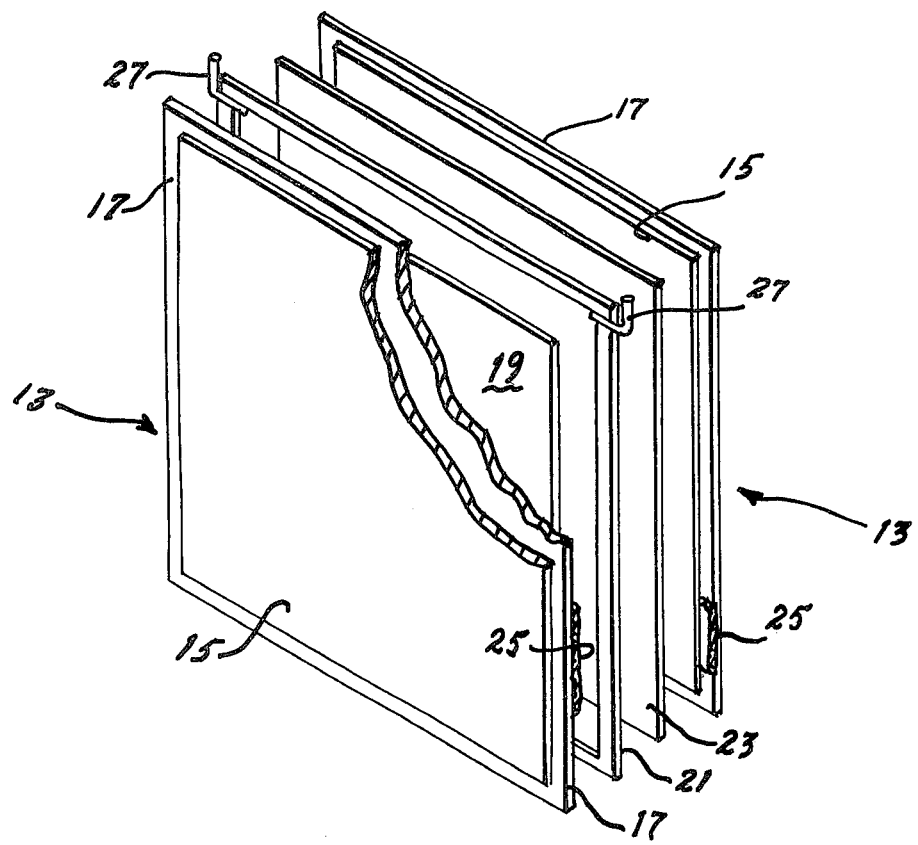
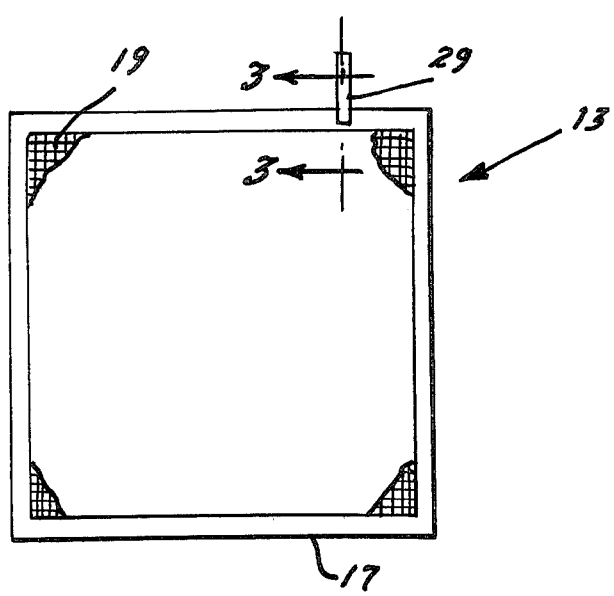

4,091,184

HIGH POWER, RECHARGEABLE, PILE TYPE SILVER ZINC BATTERY

STATEMENT OF GOVERNMENT INTEREST

This invention described herein may be manufactured and used by or for the Government for governmental purposes without the payment of any royalty thereon.

BACKGROUND OF THE INVENTION

This invention relates to a high power, rechargeable, pile type silver-zinc battery and, more particularly, the invention is concerned with providing a battery including a plurality of bipolar electrodes, each with a positive side having a porous silver matrix attached to silver foil and a negative side having a porous zic structure vapor deposited on silver foil.

It is well known that a bipolar battery is made up of a stack of bipolar electrodes sealed together at their peripheries and including electrolyte impregnated layers of material between the electrode elements. Each inner electrode element of the battery includes an imperforate support plate having a positive battery electrode on one side thereof which forms the positive plate of one cell of the battery, and having a negative battery electrode on the other side thereof forming the negative plate of another cell of the battery. The electrode elements are so closely spaced in the stack that there is very little space therebetween. The support plate for each electrode element acts as an intercell connector so that very little intercell resistance is present. Thus, these batteries are capable of delivering unusually high currents at rated voltages for short intervals in such applications, for example, as power supplies for missile/weapons and for multi-cell pile configurations in the multi-megawatt power range.

SUMMARY OF THE INVENTION

The invention is concerned with providing a high power, rechargeable, pile type silver-zinc battery capable of fabrication into a full scale submodule made up of single and multi-cell piles and having a capability of 200 amperes and an individual cell voltage of 1.20 or better. Each of the cells includes five basic elements (1) positive side of bipolar electrode, (2) negative side of bipolar electrode, (3) separator, (4) seal and adhesive and (5) intercell connector which is the substrate for the bipolar electrode. The positive side of the bipolar electrode is processed by spraying a slurry of silver oxide on a silver foil substrate and subsequent sintering. The negative side of the bipolar electrode is processed by vapor depositing on the silver foil substrate, a porous zinc structure and then zinc oxide is sprayed over this surface to complete the b-polar electrode. A separator system is positioned between each of the bipolar electrodes to retain electrolyte in the cell compartment. An epoxy adhesive is used to position and retain a Teflon seal which serves to electrically isolate the individual electrodes and form a cavity for retention of the electrolyte. The intercell connector is chemicall- etched silver foil which serves as the substrate for active material as well as the series connection between the cells.

Accordingly, it is an object of the invention to provide a bipolar electrode suitable for use in a high power, rechargeable battery which can be assembled into a full scale multi-cell pile.

Another object of the invention is to provide a high power, rechargeable, pile type silve--zinc battery including multi-cell piles capable of 200 amperes with an individual cell voltage of 1.20 or better.

Still another object of the invention is to provide a cell for a high rate, rechargeable, silver-zinc battery which includes a bipolar electrode having a positive side and a negative side, a separator, seal and adhesive and intercell connectors which function as substrate for the bipolar electrodes.

A further object of the invention is to provide a bipolar electrode for use in a multi-cell pile type battery wherein the positive side of the bipolar electrode is fabricated by spraying a slurry of silver oxide on a silver foil substrate and subsequently sintering and the negative side of the bipolar electrode is fabricated by vapor depositing a porous zinc structure on the silver foil substrate and then spraying zinc oxide thereover.

A still further object of the invention is to provide a separator for use in a multi-cell pile type battery wherein the separator is used to retain the active materials in the immediate vicinity of their respective electrodes. The separator is fabricated of one layer of Dynel fibers in the form of a non-woven mat, three layers of Cellophane and one layer of Nylon fibers in the form of non-woven material.

Another still further object of the invention is to provide a seal and adhesive for use in a cell of a pile type battery to electrically isolate the individual electrodes and form a cavity for retention of the electrolyte. An epoxy adhesive is used to position and retain a Teflon seal in its proper location.

These and other objects, features and advantages will become more apparent after considering the following description taken in conjunction with the annexed drawings and appended claims.

BRIEF DESCRIPTION OF THE DRAWINGS

FIG. 1 is a view in perspective of a cell utilizing bipolar electrodes according to the invention showing the relationship of the several elements including the bipolar electrode, separator, seal and adhesive and intercell connector.

FIG. 2 is a plan view of a bipolar electrode showing the negative side with the lead attached to the intercell connector; and FIG. 3 is a cross-sectional view of the bipolar electrode taken along the line 3—3 of FIG. 2 showing the lead and the positive side extending over the entire surface of the intercell connector.

DESCRIPTION OF A PREFERRED EMBODIMENT

Referring now to the drawings in which like reference numerals refer to like elements in the several views, FIG. 1 shows the relationship of the various components to one another. Each bipolar electrode 13 includes a positive side 15, an intercell connector 17 and a negative side 19. The positive side 15 of the bipolar electrode 13 is processed by spraying a positive active material over the intercell connector 17 which has been previously prepared by treating the surface thereof. The positive active material is a solution of silver oxide in water which is sprayed on to the intercell connector 17 to form a porous matrix of silver of between 0.12 to 0.15 grams per square inch at a thickness of 0.0016 inch. The sprayed deposition is then dryed and sintered and pressed to form the positive electrode 15.

The negative side 19 of the bipolar electrode 13 is processed by vapor depositing zinc on the other surface of the intercell connector 17 to produce a porous zinc structure. Zinc oxide is then sprayed on this surface to complete the bipolar electrode 13. The intercell connector 13 which is silver foil has been previously processed for the positive side. The active material is deposited directly on the silver foil substrate 13 at a material distribution of 0.12 to 0.14 grams per square inch with a density of 55 to 65 grams per cubic inch. In FIGS. 2 and 3 there is shown the relation of the negative active material 19 to the bipolar electrode 13. The zinc is applied only to the active cell area leaving a foil edge to which the seal 21 is attached. A final coat of zinc oxide is applied to complete the bipolar electrode 13 by spraying the active material surface with 0.06 grams per square inch.

The separator 23 is used in the silver/zinc battery for retaining the active materials in the immediate vicinity of their respective electrodes. It is used in retaining electrolyte in the cell compartment and for impeding diffusion of the soluble silver. The physical configuration of the separator 23 includes two absorbent pieces which are precut and heat sealed to each other to form an envelope. A barrier material such as Cellophane is folded to dimension in three layers and inserted into the envelope. The separator components 23 from positive to negative electrode are one layer of M1405 Webril which is fabricated from Dynel fibers into a non-woven mat 0.001 inch thick. When wetted with electrolyte, it retains its original thickness. The Cellophane, designated PUDO 193, is cellulosic in origin and processed to a dry thickness of 0.0015 inch. The wetted thickness doubles increasing to 0.003 inch to produce a total three layer thickness of 0.009 inch. The layer adjacent the negative side is R-25D Viscon which is also a non-woven material and is fabricated from Nylon (Polyamide) fibers having a dry thickness of 0.0025 inch increasing to 0.004 when wet with electrolyte. Combining all three separator components, a package 0.014 inch thick is produced.

The seal 21 is utilized to electrically isolate the individual electrodes and form a cavity for retention of the electrolyte. An epoxy adhesive 25 is used to position and retain the seal 21 in its proper location. The seal 21 is fabricated of unsintered Teflon processed from virgin tetrafluoroethylene resin to form a porous matrix sheet from which strips are cut. The porous matrix provides adequate surface area so that the adhesive 25 may penetrate past the surface effecting a good mechanical bond. The unsintered condition provides compression flow allowing the seal 21 to conform readily to its confines. The seal 21 is positioned around the perimeter of the separation package 23.

The intercell connectors 17 for the subject battery design serve as the cell case, active material substrate as well as the series connection between individual cells for electrical continuity. Each of the intercell connectors 17 is fabricated of 0.002 inch thick cold rolled silver foil which is electrochemically etched in potassium cyanide to a final thicknes of 0.0018 inch thick. This electrochemical etch produces a "cratered" surface with increased surface area for attaching the active materials thereto. The intercell connector 17 herein described minimizes the electrical path from cell-to-cell to 0.001 to 0.002 inches, resulting in a considerable reduction in voltage losses. Since the connector 17 serves as a common substrate to both active materials, the current is distributed evenly across its surface, thereby lending itself to retarding "shape change" of the negative electrode.

The vent tubes 27 are fabricated from shrink tubing to produce a tube with a 0.010 diameter hole. The hole passes through to the seal area and into each cell. A silver lead 29 is attached to the bipolar electrode 13.

In a typical bipolar multi-cell pile configuration, the modular concept is utilized using basic 100kw modules into systems of the multi-megawatt power range. Each module would be made up of 8–10 submodules containing a total of 400 cells. Each module system would contain 30 modules.

Although the invention has been illustrated in the accompanying drawings and described in the foregoing specification in terms of a preferred embodiment thereof, the invention is not limited to this embodiment or to the preferred embodiment outlined. It will be apparent to those skilled in the art that our invention could be used in the quantity processing of 600 electrodes per hour by using presently known production techniques to fabricate and assemble the several components into a multi-cell pile.

Having thus set forth the nature of our invention, what we claim and desire to secure by Letters Patent of the United States is:

1. A high power rechargeable pile type silver zinc battery including a multicell pile having a plurality of cells with bipolar electrodes therein, each of said bipolar electrodes comprising a positive side and a negative side, said positive side being formed of a sprayed coating of a slurry of silver oxide, said negative side being formed of a vapor deposited layer of porous zinc with a sprayed coating of zinc oxide thereover, a separator positioned between each of said bipolar electrodes to retain electrolyte in said plurality of cells, sealing means surrounding said separtor for electrically isolating the bipolar electrodes and forming a cavity for retention of the electrolyte, adhesive means for positioning and retaining said sealing means in position, and an intercell connector between the positive and negative sides of the bipolar electrode to operate as a substrate for attaching active materials thereto, said intercell connector being a series connection between said plurality of cells.

2. The high power rechargeable pile type silver zinc battery defined in claim 1 wherein said positive side includes a sprayed solution of silver oxide in water to form a porous matrix of silver in the range of 0.12 to 0.15 grams per square inch at a thickness of 0.0016 inches.

3. The high power rechargeable pile type silver zinc battery defined in claim 1 wherein said negative side includes a vapor deposited coating of zinc to form a porous zinc structure in the range of 0.12 to 0.14 grams per square inch with a density of 55 to 65 grams per cubic inch, and a spray coating of zinc oxide of 0.06 grams per square inch.

4. The high power rechargeable pile type silver zinc battery defined in claim 1 wherein said separator includes an envelope formed by two absorbent mats heat sealed at their edges to each other, and a barrier of cellulostic material having a plurality of folded layers in said envelope, the absorbent mats being fabricated of non-woven synthetic material.

5. The high power rechargeable pile type silver zinc battery defined in claim 4 wherein the sealing means surrounding said separator is fabricated of virgin tetrafluoroethylene resin in strip form having a porous matrix surface to provide adequate area for said adhesive means to effect a good bond.

6. The high power rechargeable pile type silver zinc battery defined in claim 4 wherein the intercell connector is electrochemically etched with potassium cyanide to produce a cratered surface thereby enhancing the attachment of the active materials thereto.

* * * * *